United States Patent
Calvarese

(10) Patent No.: US 9,523,764 B2
(45) Date of Patent: Dec. 20, 2016

(54) DETECTION OF MULTIPATH AND TRANSMIT LEVEL ADAPTATION THERETO FOR ULTRASONIC LOCATIONING

(71) Applicant: SYMBOL TECHNOLOGIES, INC., Schaumburg, IL (US)

(72) Inventor: Russell E Calvarese, Stony Brook, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 743 days.

(21) Appl. No.: 13/956,891

(22) Filed: Aug. 1, 2013

(65) Prior Publication Data
US 2015/0036462 A1 Feb. 5, 2015

(51) Int. Cl.
| | |
|---|---|
| G01S 5/18 | (2006.01) |
| G01S 5/30 | (2006.01) |
| G01S 1/72 | (2006.01) |
| G01S 11/14 | (2006.01) |
| G01S 11/16 | (2006.01) |

(52) U.S. Cl.
CPC .. *G01S 5/18* (2013.01); *G01S 5/30* (2013.01); *G01S 1/72* (2013.01); *G01S 11/14* (2013.01); *G01S 11/16* (2013.01)

(58) Field of Classification Search
CPC ...................................... G01S 3/80; H04B 1/02
See application file for complete search history.

(56) References Cited

U.S. PATENT DOCUMENTS

| | | |
|---|---|---|
| 6,537,218 B1 | 3/2003 | Simopoulos et al. |
| 7,652,625 B2 | 1/2010 | Small |
| 2012/0277988 A1 | 11/2012 | Sosulin et al. |
| 2013/0077442 A1* | 3/2013 | Hersey ............... G01S 7/536 367/99 |
| 2013/0279297 A1* | 10/2013 | Wulff ................. G01S 15/00 367/127 |

FOREIGN PATENT DOCUMENTS

| | | |
|---|---|---|
| EP | 554346 A1 | 8/1993 |
| WO | 2005088339 A1 | 9/2005 |

OTHER PUBLICATIONS

International Search Report and Written Opinion mailed Oct. 20, 2014 in counterpart PCT application No. PCT/US2014/46635.

* cited by examiner

*Primary Examiner* — Luke Ratcliffe
(74) *Attorney, Agent, or Firm* — Nong-Qiang Fan

(57) ABSTRACT

A system and method for detection of multipath and transmit level adaptation thereto in ultrasonic locationing of a mobile device within an environment includes providing fixed ultrasonic emitters for transmitting ultrasonic bursts at predetermined times. A communication device measuring at least a direct signal of each ultrasonic burst and detecting multipath of each ultrasonic burst by comparing an amplitude of the direct signal with other signals related to the ultrasonic burst. If multipath is detected a controller increasing a transmit power level of the ultrasonic burst to insure the direct signal reliably remains above the detection threshold. If multipath is not detected reduce a transmit power level to the point detection is just possible. Results from non-multipath conditions are more heavily weighted when determining position as they are typically more accurate.

16 Claims, 3 Drawing Sheets

DETECTION OF MULTIPATH AND TRANSMIT LEVEL ADAPTATION THERETO FOR ULTRASONIC LOCATIONING

BACKGROUND

An ultrasonic receiver can be used to determine its location with reference to one or more ultrasonic emitters, such as locating a mobile device having an ultrasonic receiver and being present within a retail, factory, warehouse, or other indoor environment, for example. Fixed ultrasonic emitter(s) can transmit ultrasonic energy in a short burst which can be received by an ultrasonic transducer (audio microphone) in the ultrasonic receiver. The use of several ultrasonic emitters distributed within the environment can be used to provide a specific location of a particular device using techniques known in the art such as measuring time-of-flight or signal strength of the emitter signals and using triangulation, trilateration, and the like, as have been used in radio frequency locationing systems.

However, ultrasonic emitters may not always be in the line-of-sight of the mobile device, and typical emitter signals may not be strong enough to directly penetrate through obstacles (herein referred to as attenuators) very well, such that reflected signals may reach the mobile device better than a direct signal from the emitter. This leads to inaccurate locationing results. In addition, having many mobile devices trying to establish their position within the environment, and interacting with all the emitters in the environment cannot be done simultaneously since separate emitter signals would interfere with each other, which results in a poor position update rate.

One solution for locationing uses time-slicing, where each emitter can send its ultrasonic burst and then wait for any reflected echoes to settle before the subsequent ultrasonic bursts are sent by that or other emitters. This technique solves the interference problem, but still results in a poor update rate since each emitter can only send its burst after a relatively long time. This technique also does not resolve the non-line-of-sight inaccuracy issue.

Another solution for locationing could use more ultrasonic bandwidth, where a larger range of ultrasonic frequencies can be used. However, today's mobile devices have a very limited ability to hear ultrasonic frequencies, typically between 19-22 kHz. Therefore, the only way to expand usable bandwidth would be to replace the existing audio circuitry of the mobile device to operate on higher frequencies, which is cost prohibitive. Alternatively, the usable frequencies could be expanded down into the audio range, but this would become disruptive to the users.

Accordingly, there is a need for a technique to locate a mobile device in an indoor environment while eliminating the aforementioned issues. Furthermore, other desirable features and characteristics of the present invention will become apparent from the subsequent detailed description and the appended claims, taken in conjunction with the accompanying drawings and the foregoing background.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
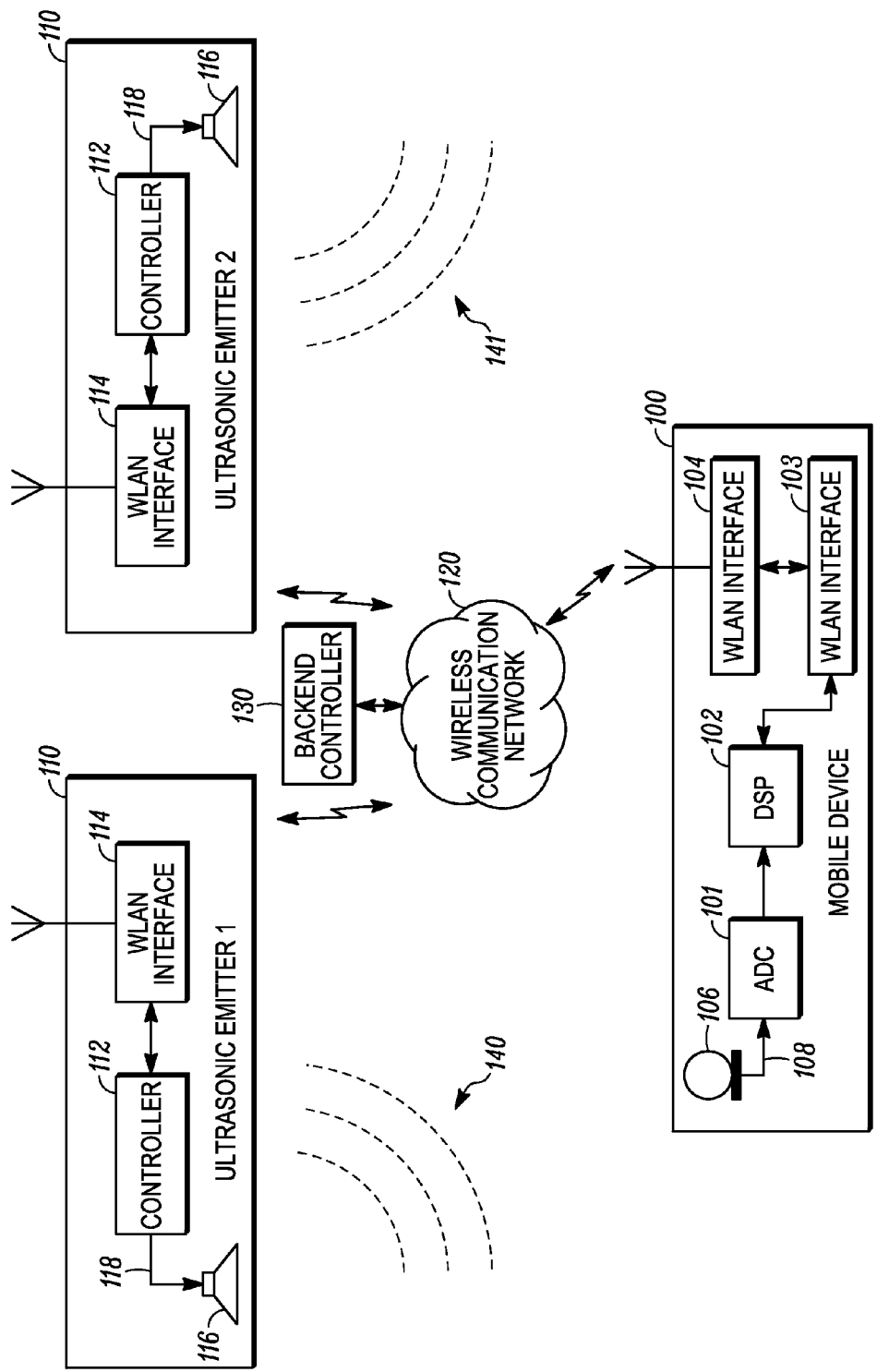
FIG. 1 is a simplified block diagram of an ultrasonic locationing system, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, an improved technique is described to locate a mobile device in an indoor while reducing problems associated with non-line-of-sight issues, multipath problems, bandwidth limitations, interference, and a poor position update rate, as will be detailed below.

The device to be located can include a wide variety of business and consumer electronic platforms such as cellular radio telephones, mobile stations, mobile units, mobile nodes, user equipment, subscriber equipment, subscriber stations, mobile computers, access terminals, remote terminals, terminal equipment, cordless handsets, gaming devices, smart phones, personal computers, and personal digital assistants, and the like, all referred to herein as a communication device. Each device comprises a processor that can be further coupled to a keypad, a speaker, a microphone, audio circuitry, a display, signal processors, and other features, as are known in the art and therefore not shown or described in detail for the sake of brevity.

Various entities are adapted to support the inventive concepts of the embodiments of the present invention. Those skilled in the art will recognize that the drawings herein do not depict all of the equipment necessary for system to operate but only those system components and logical entities particularly relevant to the description of embodiments herein. For example, routers, controllers, servers, switches, access points/ports, and wireless clients can all includes separate communication interfaces, transceivers, memories, and the like, all under control of a processor. In general, components such as processors, transceivers, memories, and interfaces are well-known. For example, processing units are known to comprise basic components such as, but not limited to, microprocessors, microcontrollers, memory cache, application-specific integrated circuits, and/or logic circuitry. Such components are typically adapted to implement algorithms and/or protocols that have been expressed using high-level design languages or descriptions, expressed using computer instructions, and/or expressed using messaging logic flow diagrams.

Thus, given an algorithm, a logic flow, a messaging/signaling flow, and/or a protocol specification, those skilled in the art are aware of the many design and development techniques available to implement one or more processors that perform the given logic. Therefore, the entities shown represent a system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the memory and control aspects of the present invention may be implemented in any of the devices listed above or distributed across such components.

FIG. 1 is a block diagram of an ultrasonic locationing system, in accordance with the present invention. A plurality of ultrasonic transponders such as a piezoelectric speaker or emitter 116 can be implemented within the environment. Each emitter can send a short burst of ultrasonic sound at varying amplitudes (e.g. 140, 141) within the environment. The mobile device 100 can include a digital signal processor 102 to process the ultrasonic signal 140 received by a transponder such as a microphone 106, and specifically the frequency components of the signals 140, 141 from the ultrasonic emitters 116 in accordance with the present invention.

The microphone 106 provides electrical signals 108 to receiver circuitry including a signal processor 102. It is envisioned that the mobile device can use existing audio circuitry having typical sampling frequencies of 44.1 kHz, which is a very common sampling frequency for commercial audio devices, which relates to a 22.05 kHz usable upper frequency limit for processing audio signals. It is envisioned that the mobile device receiver circuitry is implemented in the digital domain using an analog-to-digital converter 101 coupled to a digital signal processor 102, for example. It should be recognized that other components, including amplifiers, digital filters, and the like, are not shown for the sake of simplicity of the drawings. For example, the microphone signals 108 can be amplified in an audio amplifier after the microphone 106.

The processor 102 can also be coupled to a controller 103 and wireless local area network interface 104 for wireless communication with other devices, and controllers 130 in the communication network 120. Each emitter 110 can be coupled to its own controller 112 and wireless local area network interface 114 for wireless communication with the server or backend controller 130 in the communication network 120. Alternatively, either or both of the mobile device 100 and emitters 110 could be connected to the communication network 120 through a wireless local area network connection (as shown) or a wired interface connection (not represented), such as an Ethernet interface connection. The wireless communication network 120 can include local and wide-area wireless networks, wired networks, or other IEEE 802.11 wireless communication systems, including virtual and extended virtual networks. However, it should be recognized that the present invention can also be applied to other wireless communication systems. For example, the description that follows can apply to one or more communication networks that are IEEE 802.xx-based, employing wireless technologies such as IEEE's 802.11, 802.16, or 802.20, modified to implement embodiments of the present invention. The protocols and messaging needed to establish such networks are known in the art and will not be presented here for the sake of brevity.

The controller 112 of each ultrasonic emitter 110 provides the speaker 116 with a frequency tone 140, 141 to emit in an ultrasonic burst 140 at a specified time. The speaker will typically broadcast the burst with a duration of about 2 milliseconds. The particular frequency and timing between subsequent bursts to be used by each emitter 110 can be directed by the backend controller 130 via the network 120. The emitters are configured to have usable output across about a 19-22 kHz frequency range.

The processor 102 of the mobile device 100 is operable to discern the frequency and timing of tone received in its microphone signal 108. The tone is broadcast at a frequency within the frequency range of about 19-22 kHz to enable the existing mobile device processor 102 analyze the burst in the frequency domain to detect the tone. The 19-22 kHz range has been chosen such that the existing audio circuitry of the mobile device will be able to detect ultrasonic tones without any users within the environment hearing the tones. In addition, it is envisioned that there is little audio noise in the range of 19-22 kHz to interfere with the ultrasonic tones.

It is envisioned that the processor 102 of the mobile device will use a Fast Fourier Transform (FFT) to discern the burst tones for timing and or received signal strength indicators (RSSI) measurements in the frequency domain. In particular, a Goertzel algorithm can be used to detect timing of the receipt of the tone to be used for flight time measurements. In practice, the mobile device can simply measure the time when it receives tones for two or more different emitters, and supply this timing information to the backend controller. The backend controller 130 can receive the timing information from the mobile device, and subtract the time that the emitter was directed to emit the burst, in order to determine the flight time of each burst to the mobile device. Given the flight time of different emitter signals to the mobile device along with the known positions of the fixed emitters, the back end controller can determine a location of the mobile device using known trilateration techniques, for example. In another scenario, the mobile device can measure the signal strength of received tones for two or more different emitters, and supply signal strength and timing information to the backend controller. The back end controller, knowing the time that it directed each emitter to send its burst can then determine the distance to the mobile device for each emitter's tone, where closer emitters producing stronger tones. Using known trilateration techniques, then backend controller can then determined the location of the mobile device. Alternatively, the mobile device can receive the time that the burst was sent from the backend controller or emitter itself, and subtract that from the time that the mobile device received the burst, in order to determine the flight time of the burst to the mobile device. Given the flight time of different emitter signals to the mobile device along with the known positions of the fixed emitters, the mobile device can determine its own location.

For example, if a device's hardware has the capability to perform more accurate flight time measurements, considering that some mobile devices support more accurate/higher refresh rate modes, then the backend controller can drive emitters to broadcast locationing tones at predefined times for flight time measurements, and a flight time locationing mode can be used by a mobile device to measure the timing of those locationing tones, and if a device's hardware only has the capability to perform less accurate signal strength measurements (i.e. received signal strength indicators or RSSI), then the backend controller can drive emitters to broadcast locationing tones for signal strength measurements, and a signal strength locationing mode can be used by that device to measure the signal strength of those locationing tones. If multiple communication devices responded to the tone of the same emitter, then the backend controller can individually-assigned a time-slice for each of those multiple communication devices to perform locationing. In this case, the period of each assigned time slice is dependent on the assigned locationing capabilities of the respective communication device, i.e. how long that device will need to perform the locationing measurements.

The present invention operates within a limited ultrasonic frequency range of 19-22.05 kHz. Given that the pulse duration needs to be very short for accuracy, and due to limited smart phone capabilities, only one or two different high sound pressure level (SPL) frequencies can be used before they overlap within this frequency range. Also, due to Doppler shifts that can occur with a mobile device, guard bands between specific frequencies must be used, and therefore the amount of discernible frequency tones that can be accurately recognized within this range is limited. In the ultrasonic band of interest (19 kHz to 22.05 kHz), it is only possible to distinguish four or five distinct tones while still leaving room for as much as +/−125 Hz of Doppler shift (enough margin to accommodate that which would be present from a very fast walking speed).

Each emitter is configured to broadcast the burst over a limited coverage area or region. For unobtrusiveness and clear signaling, the emitters can be affixed to a ceiling of the environment, where the position and coverage area of each emitter is known and fixed, with the emitter oriented to emit a downward burst towards a floor of the environment, such that the burst from an emitter is focused to cover only a limited, defined floor space or region of the environment.

In practice, it has been determined that one emitter in a typical retail environment can provide a coverage area of about fifty feet square. Therefore, a plurality of emitters 110 is provided to completely cover an indoor environment, and these emitters are spaced in a grid about fifty feet apart. A mobile device that enters the environment and associates to the wireless local area network (WLAN) of the backend controller, and is provided a software application to implement the locationing techniques described herein, in accordance with the present invention.

For locationing purposes, the backend controller can direct specific emitters to emit their bursts at particular times. The present invention provides that emitters in neighboring regions do not emit their ultrasonic burst at the same time, to avoid interference, although emitters in non-neighboring regions can emit their ultrasonic burst at the same time if there is minimum interferences therebetween. Different frequencies, groups of frequencies, burst durations, and burst timings can be used by each emitter. A mobile communication device can receive these tones and provide timing and/or signal strength information to the backend controller that includes a locationing engine, which can used to locate the mobile device. For example, the mobile device can transmit timing, single strength or RSSI, and possibly frequency, information about the tones it detects over the communication network 120 to a backend controller 130, which can determine the location of the mobile device based on this information and a known floor plan of the emitter locations. In this example, it is assumed that the timing of the backend controller and mobile devices is synchronized.

Mobile devices benefit from maximum possible refresh rate of its location. During locationing, those mobile devices that are using flight time measurements are expected to have a position update rate of about every 500 mS (two updates per second for three samples—averaging 1.5 seconds). Those mobile devices that are using signal strength measurements are expected to have a position update rate of about every two seconds with three samples—averaging 6 seconds. Each communication device performs its locationing measurements needed by the backend controller using locationing tones broadcast from emitters activated by the backend controller. The locationing tones are emitted at a higher, typically 10-15 dB higher, sound pressure level than normal in order to penetrate objects (i.e. attenuators) in the environment to provide a more accurate line-of-sight measurement instead of attenuated or reflected signals (i.e. multipath) which would give inaccurate flight time or signal strength measurements, and therefore an inaccurate location of the device.

The present invention addresses the problem of reflected or attenuated signals giving inaccurate flight time or signal strength measurements in order to provide an accurate location of the device. In particular, the present invention detects a multipath condition in an emitter burst and adapts transmit level of the emitter to provide a more accurate direct signal for ultrasonic locationing. In accordance with the present invention, each ultrasonic burst should last on the order of 2 ms in duration and will have an adjustable, higher than normal SPL. This will provide a signal capable of penetrating intervening attenuators (e.g. shelving) directly to the mobile device, even if the emitter is not in a line-of-sight of the mobile device.

Figure 2:
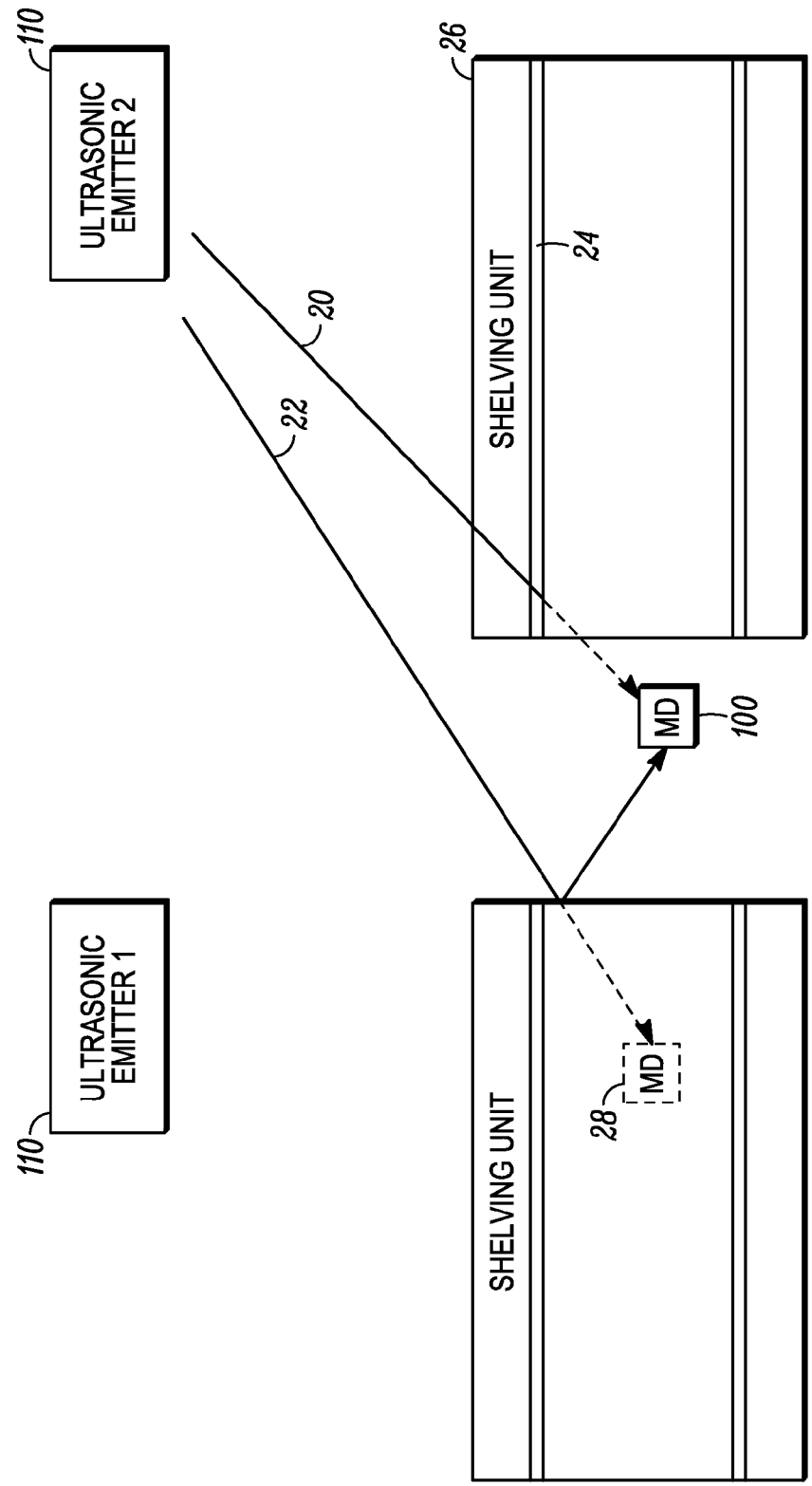
FIG. 2 is a side view of an indoor environment with emitters and associated direct and reflected signals therefrom, in accordance with some embodiments of the present invention.

Referring to FIG. 2, in practice, a typical retail environment includes shelving 26, racks 24 and other objects that make accurate locationing difficult due to reflections and attenuation as described above. For example, if only a reflected signal 22 is detected, an improper location 28 of the mobile device can result. The present invention improves performance for this non-line-of-sight (non-LOS) condition, where a mobile device 100 is not within the LOS of the emitter 110, with minimal impact on position update rate of the locationing engine. In the example shown, the mobile device 100 is in a non-LOS condition with respect to emitter 2, where the direct signal from that emitter passes through a shelf 24 (attenuator) making the amplitude of that direct signal 20 less than if the mobile device was in a LOS condition, such as is the case with emitter 1. Further, the reflected signals 22 may have a higher amplitude than the attenuated direct signal 20 which can result in an inaccurate location 28 of the device 100. The present invention determines that the mobile device 100 is in a non-LOS condition by detecting a multipath condition where the direct signal 20 has a lower amplitude than reflected signals 22, as will be detailed below.

The techniques described herein are specific to a flight time based ultrasonic positioning system but may apply to RF systems as well. It should be recognized that there is a subtle difference how multipath affects performance between ultrasonic flight time locationing and other systems. Typically, multipath deals with the difficulties caused by construction/destruction of signals, whereas for ultrasonic flight time systems, detection of the direct path signal 20 is critical to time the flight. Typically pulse widths are short enough such that the reflected signals 22 arrive after the direct path signal is detected by the mobile device, and a conglomeration of constructed/destructed reflected signals 22 occurs after reception of the direct path signal. The present invention provides techniques to distinguish direct path signals from reflections, in order to discern and accommodate multipath and non-LOS conditions. Accuracy increases if direct path signals can be distinguished and more heavily weight than reflected signals received from individual emitters.

The present invention increases the transmit power level of emitter ultrasonic bursts (e.g. ranging pulses) well beyond what is needed for line-of-sight (LOS) detection. As a result, the direct path signal of the ultrasonic burst penetrates through attenuators at levels that are still over the environmental noise level, giving adequate signal-to-noise ratio (SNR). In addition, signals can experience minor reflections (that exhibit small angular deviations of the direct signal) off small reflective surfaces within the shelves/racks with sufficient SNR such that the path taken is shorter than for large area reflectors father away.

Referring to FIGS. 1 and 2, in the present invention a plurality of fixed ultrasonic emitters 110, with known locations, are distributed within an indoor environment, such as a retail store. The emitters are operable to transmit ultrasonic bursts 140, 141 at predetermined times to a communication device 100 located within the environment. The predetermined times can be scheduled by the backend controller 130 to avoid interference between nearby emitters. In other words, the emitters are scheduled far enough apart in time such that any device within the locality of that emitter will receive and report that burst back to a locationing engine before any other emitter has the chance to emits its burst and be detected by that device. The emitters can be affixed to a ceiling of the environment and oriented towards a floor of the environment to provide a limited region for communication devices to receive the ultrasonic burst, thereby further reducing the chances of interference. Each ultrasonic burst can have an ultrasonic frequency between 19 kHz and 22.05 kHz, which can be processed by existing, unmodified audio circuitry of a smartphone, for example.

Due to obstructions 24, 26 in the environment and the nature of ultrasonic signals, the communication device can receive multiple copies (multipath) of the ultrasonic burst, including a direct path signal 20 and one or more reflected signals 22. Inasmuch as the ultrasonic burst is very short, the communication device typically will detect these direct and reflected signals at discrete moments in time, i.e. the direct signal does not overlap the reflected signals. In order to minimize the possibility of receiving an interfering signal from another emitter, the communication device 100 can limit its measuring time for a particular ultrasonic burst to a window having a predetermined length of time, such as 50-100 ms for example. The length of time is chosen to capture possible reflected signals when the mobile device is experiencing a multipath, non-LOS condition. If the mobile device is experiencing a LOS condition the direct signal will overwhelm any reflected signals, which can then be ignored. In this case, the size of the detection window can be reduced greatly for subsequent measurements, which has the advantage of allowing more numerous refresh updates to improve location tracking of the device as it moves through the environment.

For flight time locationing, the communication device ideally attempts to measure the arrival time of each direct signal from each detectable emitter. This is reported to a locationing engine in the back end controller, for example, which subtracts the reported arrival time from the known emit time for a burst from an emitter to determine flight time for that ultrasonic burst. Using this information from two or more different emitters can be used to determine a location of the device. However, this does not account for the case when the mobile device is confused about which signal is actually the direct signal.

Therefore, in accordance with the present invention, when the direct path signal is detected, the mobile device will record the reception time, as always, but continue capturing in a measurement window such that a composite amplitude of the conglomerate of reflected signals can be recorded. The mobile device will compare the amplitudes of the direct and reflected signals to establish whether it is experiencing a multipath, non-LOS condition, as will be detailed below.

In accordance with the present invention, if it is determined that the mobile device is not subject to multipath, emitter amplitude can be reduced to the point detection is just possible, and in turn is not necessary to wait as long for ultrasonic reverberations to die out, so ultrasonic bursts can occur more frequently. If multipath is detected, the SPL of the emitter can be adapted (increased) to "punch though" attenuators to be detected as a direct signal by the mobile device and the time between subsequent emitter bursts needs to be expanded. Results from non-multipath conditions are more heavily weighted when determining position as they are typically more accurate.

The present invention envisions two techniques to detect a multipath condition, each technique comparing the amplitude of the direct signal to at least one other signal. In a first technique, the at least one other signal is the conglomerate of the reflected signals measured within the detection window. In this case, the mobile device will measure the amplitude of the first arriving (direct) signal and a composite amplitude of the conglomerate reflected signals that follow within the measurement window. The mobile device will deliver these two amplitudes and their timing information to the component responsible to determine location based on flight times. This component can be within the mobile device itself if it receives the burst emit time from the backend controller, or more typically the component is a locationing engine in the backend controller. The component, having the flight distance from the device to each measured emitter, can then decide whether the device is experiencing a non-LOS, multipath condition. For example, the component can weight its decision based on whether the amplitude of the direct signal is less than the reflected signals, given that a non-LOS signal may still be the direct path signal. In particular, the gross ratio of the amplitude of the direct signal versus a composite amplitude of the conglomeration of reflected signals is taken, and multipath of the ultrasonic burst is detected when that ratio is less than a first multipath threshold, which can be determined empirically. A ratio lower than the first multipath threshold indicates a multipath, non-LOS condition, and a ratio higher than the first multipath threshold indicates a non-multipath, LOS condition.

In the second technique, the at least one other signal is an estimated amplitude of direct signal to the communication device in a LOS condition. In this case, the mobile device will measure the amplitude of the first arriving (direct) signal and the component can estimate the amplitude of a direct LOS signal to the mobile device given a previous location of the mobile device with respect to the emitter. The mobile device will deliver these two amplitudes and the timing information of the measured direct signal to the component responsible to determine location based on flight times. The component, having the flight distance from the device to each measured emitter, can then decide whether the device is experiencing a non-LOS, multipath condition. For example, the component can weight its decision based on whether the amplitude of the measured direct signal is less than the expected amplitude of an estimated direct, LOS signal, given a SPL level of the emitter and an immediately previous location of the mobile device, which implies that a non-LOS case is more likely, i.e. the direct path signal is being attenuated. In particular, the gross ratio of an amplitude of the direct signal versus a the calculated direct, LOS signal is taken, and multipath of the ultrasonic burst is detected when that ratio is less than a second multipath threshold, which can be determined empirically. A ratio lower than the second multipath threshold indicates a multipath, non-LOS condition, and a ratio higher than the second multipath threshold indicates a non-multipath, LOS condition.

The indications from both techniques can be weighted to determine the amount that the path between individual transmitter and device is affected by multipath or not, i.e. whether the measurement are below a detection threshold. Again, this weighting between techniques could be determined empirically. If measurements using one or both of the above two weighted techniques establishes that a multipath, non-LOS condition exists for the mobile device with respect to a certain emitter, the back end controller can direct that emitter to adapt its transmit power level of the ultrasonic burst until an amplitude of the direct signal in subsequent measurings and detections is above the detection threshold whereby multipath is no longer detected.

In this way, the present invention can adapt the transmit level of individual emitters, and measurement windows of each mobile device, such that all devices experiencing a non-LOS condition can reliably detect direct path signals without excessive SPL, which will provide an optimum locationing refresh rate. If it is determined that all devices in range of an emitter are experiencing a LOS condition, the backend controller can reduce the transmit power level of that emitter to a minimum level needed to adequately trip the detection algorithm in each mobile device. In this way penetration through attenuators is traded-off for increased location update rate due to reduced reverberation/multipath. In this case, the present invention can periodically test for existence of non-LOS devices.

In this way, the present invention can more heavily weight results obtained when it is known little or no multipath is present as LOS results are typically more accurate.

Figure 3:
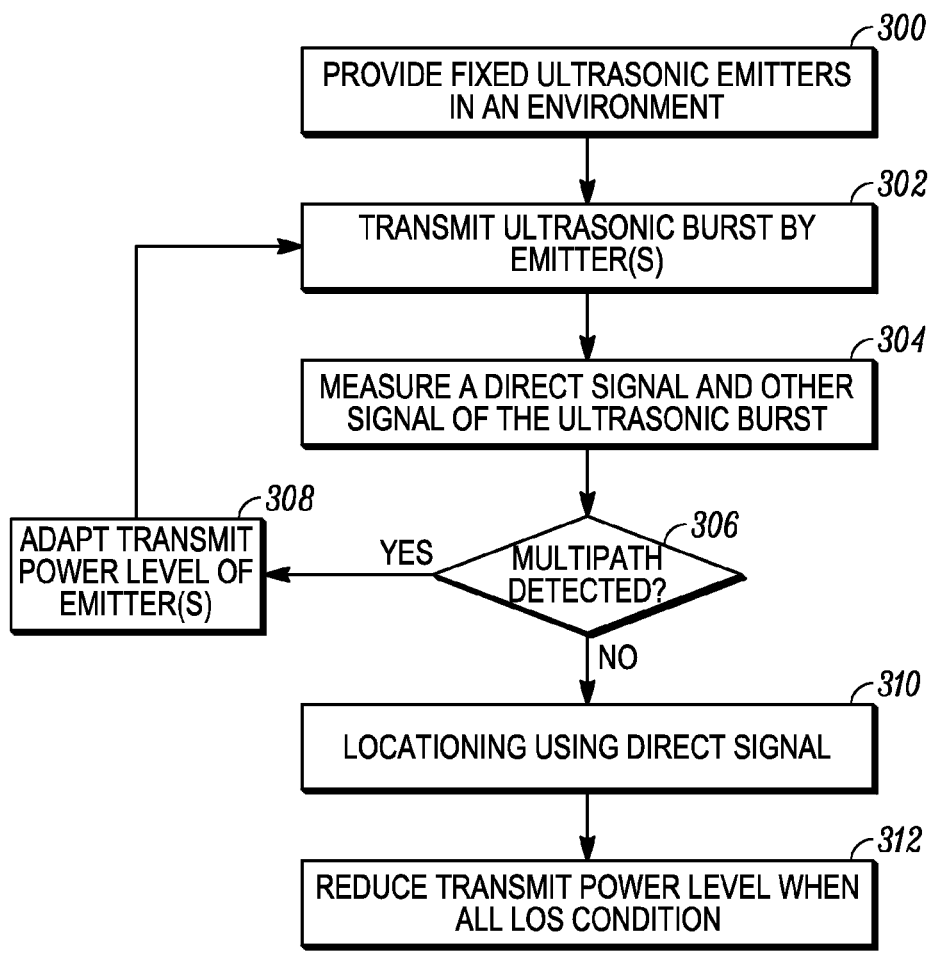
FIG. 3 is a flow diagram illustrating a method, in accordance with some embodiments of the present invention.

FIG. 3 is a flowchart illustrating a method for detection of multipath and transmit level adaptation thereto in ultrasonic locationing of a mobile device within an environment, according to some embodiments of the present invention.

A first step 300 includes providing a plurality of fixed ultrasonic emitters within the environment. The emitters can be affixed to a ceiling of the environment and oriented towards a floor of the environment to provide a limited region for communication devices to receive the ultrasonic burst.

A next step 302 includes transmitting ultrasonic bursts by the emitters to a communication device located within the environment at predetermined times. The ultrasonic bursts can have a frequency between 19 kHz and 22.05 kHz.

A next step 304 includes measuring at least a direct signal of each ultrasonic burst using existing, unmodified audio circuitry of the communication device, which can process 19 kHz and 22.05 kHz signals. This can includes repeated measuring having a predetermined length of time between measurements, and wherein if multipath is not detected in detecting reducing the length of time between the measurements for subsequent measuring.

A next step 306 includes detecting multipath of each ultrasonic burst by comparing an amplitude of the direct signal with at least one other signal related to the ultrasonic burst. For example, the at least one other signal in measuring includes reflected signals of the ultrasonic burst, and wherein detecting includes comparing an amplitude of the direct signal with a composite amplitude of the conglomeration of reflected signals, and multipath of the ultrasonic burst is detected when a ratio of the amplitude of the direct signal with the composite amplitude of the reflected signals is less than a first multipath threshold. In another example, the at least one other signal in measuring includes an estimated direct signal to the communication device in a line-of-sight condition, and wherein detecting includes comparing an amplitude of the direct signal with an estimated amplitude of the estimated direct signal to the communication device in a line-of-sight condition, and multipath of the ultrasonic burst is detected when a ratio of the amplitude of the direct signal with the estimated amplitude of the estimated direct signal to the communication device in a line-of-sight condition is less than a second multipath threshold.

If multipath is detected adapting 308 a transmit power level of the ultrasonic burst in the transmitting step until an amplitude of the direct signal in measuring is above a detection threshold in detecting whereby multipath is no longer detected.

If multipath is not detected, locationing 310 of the communication device uses the direct signal of each of a plurality of ultrasonic bursts. These direct signals can provide time-of-flight information or signal strength information that can be used by the backend controller to locate the communication device.

An optional step 312 includes reducing the transmit power level of the emitter towards a minimum power level where all devices maintain a line-of-sight condition.

The above steps can be repeated periodically to keep track of mobile devices moving within, entering, or leaving the environment.

Advantageously, the present invention provides an ultrasonic locationing system using a receiver running an existing audio codec running at a sample rate of 44.1 kHz, and audio microphone, and a digital signal processor, all of which are present in nearly every smart phone that is manufactured today. The present invention can be implemented using this existing hardware and a software app which could be downloaded and installed to use the existing hardware in the novel way described herein.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors or processing devices such as microprocessors, digital signal processors, customized processors and field programmable gate arrays and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits, in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a compact disc Read Only Memory, an optical storage device, a magnetic storage device, a Read Only Memory, a Programmable Read Only Memory, an Erasable Programmable Read Only Memory, an Electrically Erasable Programmable Read Only Memory, and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for detection of multipath and transmit level adaptation thereto in ultrasonic locationing of a mobile device within an environment, the system comprising:
   a plurality of fixed ultrasonic emitters within the environment, the fixed ultrasonic emitters operable to transmit ultrasonic bursts at predetermined times to a communication device located within the environment;
   a communication device operable to measure at least a direct signal of each ultrasonic burst and detect multipath of each ultrasonic burst by comparing an amplitude of the direct signal with other signals related to the ultrasonic burst; and
   a controller coupled to the emitters, wherein if multipath is detected the controller is operable to adapt a transmit power level of the ultrasonic burst until an amplitude of the direct signal is above a threshold in detecting whereby multipath is no longer detected, and wherein if multipath is not detected the controller is operable to locate the communication device using the direct signal of each of a plurality of ultrasonic bursts.

2. The system of claim 1, wherein communication device is operable to measure at least a direct signal of each ultrasonic burst and detect multipath of each ultrasonic burst again after a predetermined length of time to create repeated measurements, and wherein if multipath is not detected the predetermined length of time between the repeated measurements is reduced for subsequent measuring.

3. The system of claim 1, wherein at least one of the other signal includes reflected signals of the ultrasonic burst, and wherein the communication device is operable to compare an amplitude of the direct signal with a composite amplitude of the reflected signals, and multipath of the ultrasonic burst is detected by the controller when a ratio of the amplitude of the direct signal with the composite amplitude of the reflected signals is less than a first multipath threshold.

4. The system of claim 1, wherein at least one of the other signal includes an estimated direct signal to the communication device in a line-of-sight condition, and wherein the communication device is operable to compare an amplitude of the direct signal with an estimated amplitude of the estimated direct signal to the communication device in a line-of-sight condition, and multipath of the ultrasonic burst is detected by the controller when a ratio of the amplitude of the direct signal with the estimated amplitude of the estimated direct signal to the communication device in a line-of-sight condition is less than a second multipath threshold.

5. The system of claim 1, wherein the controller is further operable to reduce the transmit power level of the ultrasonic burst to a minimum power level where all devices maintain a line-of-sight condition.

6. The system of claim 1, wherein the fixed ultrasonic emitters can be affixed to a ceiling of the environment and oriented towards a floor of the environment to provide a limited region for communication devices to receive the ultrasonic burst.

7. The system of claim 1, where the fixed ultrasonic emitters utilize ultrasonic bursts having a frequency between 19 kHz and 22.05 kHz and the communication device utilizes existing, unmodified audio circuitry to measure the signals from the ultrasonic burst.

8. The method of claim 7, wherein measuring includes repeated measuring over subsequent windows of time having a predetermined length of time, and wherein if multipath is not detected in detecting reducing the length of time of the subsequent windows.

9. The method of claim 7, wherein at least one of the other signal in measuring includes reflected signals of the ultrasonic burst, and wherein detecting includes comparing an amplitude of the direct signal with a composite amplitude of the reflected signals, and multipath of the ultrasonic burst is detected when a ratio of the amplitude of the direct signal with the composite amplitude of the reflected signals is less than a first multipath threshold.

10. The method of claim 7, wherein at least one of the other signal in measuring includes an estimated direct signal to the communication device in a line-of-sight condition, and wherein detecting includes comparing an amplitude of the direct signal with an estimated amplitude of the estimated direct signal to the communication device in a line-of-sight condition, and multipath of the ultrasonic burst is detected when a ratio of the amplitude of the direct signal with the estimated amplitude of the estimated direct signal to the communication device in a line-of-sight condition is less than a second multipath threshold.

11. The method of claim 7, further comprising reducing the transmit power level of the ultrasonic burst to a minimum power level where all devices maintain a line-of-sight condition.

12. The method of claim 7, wherein the step of providing a plurality of fixed ultrasonic emitters includes affixing the fixed ultrasonic emitters to a ceiling of the environment and oriented towards a floor of the environment to provide a limited region for communication devices to receive the ultrasonic burst.

13. The method of claim 7, where transmitting utilizes ultrasonic bursts having a frequency between 19 kHz and 22.05 kHz and the communication device utilizes existing, unmodified audio circuitry to measure the signals from the ultrasonic burst.

14. The method of claim 7, wherein locationing utilizes time-of-flight information of the direct signal of the ultrasonic burst.

15. The system of claim 1, wherein the controller utilizes time-of-flight information of the direct signal of the ultrasonic burst to location the communication device.

16. A method for detection of multipath and transmit level adaptation thereto in ultrasonic locationing of a mobile device within an environment, the method comprising the steps of:

providing a plurality of fixed ultrasonic emitters within the environment;

transmitting ultrasonic bursts by the fixed ultrasonic emitters at predetermined times to a communication device located within the environment;

measuring at least a direct signal of each ultrasonic burst; and detecting multipath of each ultrasonic burst by comparing an amplitude of the direct signal with at least one other signal related to the ultrasonic burst;

wherein if multipath is detected adapting a transmit power level of the ultrasonic burst in the transmitting step until an amplitude of the direct signal in measuring is above a detection threshold in detecting whereby multipath is no longer detected, and wherein if multipath is not detected locationing of the communication device uses the direct signal of each of a plurality of ultrasonic bursts.

* * * * *